(12) United States Patent
Wu

(10) Patent No.: US 8,949,589 B2
(45) Date of Patent: *Feb. 3, 2015

(54) METHOD AND APPARATUS FOR INTEGRATING PERSONAL COMPUTER AND ELECTRONIC DEVICE FUNCTIONS

(71) Applicant: Getac Technology Corporation, Taipei (TW)

(72) Inventor: Chia-Chuan Wu, Taipei (TW)

(73) Assignee: Getac Technology Corp., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,483

(22) Filed: Apr. 29, 2014

(65) Prior Publication Data

US 2014/0317393 A1   Oct. 23, 2014

Related U.S. Application Data

(63) Continuation of application No. 12/010,817, filed on Jan. 30, 2008, now Pat. No. 8,751,779, which is a continuation of application No. 10/859,848, filed on Jun. 3, 2004, now abandoned, which is a continuation-in-part of application No. 10/352,676, filed on Jan. 28, 2003, now Pat. No. 6,765,788.

(30) Foreign Application Priority Data

Nov. 12, 2002   (TW) .............................. 91133178 A

(51) Int. Cl.
*G06F 9/00* (2006.01)
*G06F 15/177* (2006.01)
(Continued)

(52) U.S. Cl.
CPC ................ *G06F 9/4406* (2013.01); *G06F 1/26* (2013.01)
USPC .................................. 713/2; 713/1; 713/100

(58) Field of Classification Search
CPC ..... G06F 9/445; G06F 9/4406; G06F 9/4401; G06F 9/44505; G06F 9/441; G06F 1/1671; G06F 11/1417
USPC .................................................. 713/1, 2, 100
See application file for complete search history.

(56) References Cited

U.S. PATENT DOCUMENTS

| | | | |
|---|---|---|---|
| 5,446,904 A | 8/1995 | Belt et al. | |
| 5,551,033 A | 8/1996 | Foster et al. | |

(Continued)

FOREIGN PATENT DOCUMENTS

| | | | |
|---|---|---|---|
| CN | 1182930 A | 5/1998 | |
| CN | 1315685 A | 10/2001 | |

(Continued)

OTHER PUBLICATIONS

Livingston et al., "More Windows 98 Secrets," IDG Books, published 1999, Chapter 22, "Power Management," pp. 623-635.

(Continued)

*Primary Examiner* — Jaweed A Abbaszadeh
(74) *Attorney, Agent, or Firm* — Finnegan, Henderson, Farabow, Garrett & Dunner LLP

(57) ABSTRACT

An apparatus and a method for integrating personal computer and electronic device functions. An input device, personal computer host, and encoder in turn integrate hardware, operating system, and application programs to provide personal computer and electronic device functions at the same time.

9 Claims, 2 Drawing Sheets

(51) Int. Cl.
*G06F 9/44* (2006.01)
*G06F 1/26* (2006.01)

(56) References Cited

U.S. PATENT DOCUMENTS

| | | | |
|---|---|---|---|
| 5,613,135 A | 3/1997 | Sakai et al. |
| 5,715,464 A | 2/1998 | Crump et al. |
| 5,752,044 A | 5/1998 | Crump et al. |
| 5,754,798 A | 5/1998 | Uehara et al. |
| 5,758,174 A | 5/1998 | Crump et al. |
| 5,765,004 A | 6/1998 | Foster et al. |
| 5,854,624 A | 12/1998 | Grant |
| 5,881,318 A | 3/1999 | Liebenow |
| 5,881,381 A | 3/1999 | Yamashita et al. |
| 5,884,085 A | 3/1999 | Sakai et al. |
| 5,892,503 A | 4/1999 | Kim |
| 5,903,766 A | 5/1999 | Walker et al. |
| 5,905,914 A | 5/1999 | Sakai et al. |
| 5,978,923 A | 11/1999 | Kou |
| 5,986,586 A | 11/1999 | Tsai |
| 5,999,994 A | 12/1999 | Wakeland et al. |
| 6,003,131 A | 12/1999 | Lee et al. |
| 6,006,285 A | 12/1999 | Jacobs et al. |
| 6,081,752 A | 6/2000 | Benson, IV et al. |
| 6,115,813 A | 9/2000 | Hobson et al. |
| 6,170,024 B1 | 1/2001 | Wakeland et al. |
| 6,223,293 B1 | 4/2001 | Foster et al. |
| 6,226,237 B1 | 5/2001 | Chan et al. |
| 6,266,714 B1 | 7/2001 | Jacobs et al. |
| 6,301,673 B1 | 10/2001 | Foster et al. |
| 6,326,935 B1 | 12/2001 | Boger |
| 6,349,386 B1 | 2/2002 | Chan |
| 6,360,327 B1 | 3/2002 | Hobson |
| 6,378,068 B1 | 4/2002 | Foster et al. |
| 6,414,675 B1 | 7/2002 | Shen |
| 6,509,911 B1 | 1/2003 | Shimotono |
| 6,529,145 B1 | 3/2003 | Lin |
| 6,681,335 B1 | 1/2004 | Rice et al. |
| 6,691,234 B1 | 2/2004 | Huff |
| 6,725,384 B1 | 4/2004 | Lambino et al. |
| 6,832,311 B2 | 12/2004 | Morisawa |
| 6,882,335 B2 | 4/2005 | Saarinen |
| 6,948,058 B2 | 9/2005 | Tung |
| 2001/0056509 A1 | 12/2001 | Iwata |
| 2002/0070924 A1 | 6/2002 | Peterson |
| 2002/0162444 A1 | 11/2002 | Yu et al. |
| 2002/0181192 A1 | 12/2002 | Huang et al. |
| 2003/0063071 A1 | 4/2003 | Wyatt |
| 2003/0093658 A1 | 5/2003 | Wen et al. |

FOREIGN PATENT DOCUMENTS

| | | |
|---|---|---|
| CN | 1437106 A | 8/2003 |
| JP | 1-261747 A | 10/1989 |
| JP | 6-103019 A | 4/1994 |
| JP | 10-111746 | 4/1998 |
| JP | 2000-20285 | 1/2000 |
| JP | 2000-152138 A | 5/2000 |
| JP | 2000-194545 A | 7/2000 |
| JP | 2000-242395 | 9/2000 |
| JP | 2001-306327 A | 11/2001 |
| JP | 2002-91634 | 3/2002 |
| JP | 2002-99403 A | 4/2002 |
| JP | 2002-108486 | 4/2002 |
| JP | 2003-150379 | 5/2003 |
| TW | 399168 | 9/1986 |
| TW | 510557 | 8/1987 |
| TW | 432275 | 3/1988 |
| TW | 444180 | 5/1988 |
| TW | 572277 | 4/1990 |
| TW | 571200 | 8/1991 |
| TW | 153475 | 11/1999 |
| TW | 462011 | 6/2000 |

OTHER PUBLICATIONS

Author Unknown; "FKB-8811 Multimedia Keyboard Specification.doc Issue 3.0"; Created Jul. 2002; pp. 1-3.
Author Unknown; "FKB-8811 Multimedia Keyboard Specification.doc Issue 5.0"; Created Jul. 2002; pp. 1-3.
Author Unknown; "LINDY Multimedia Keyboard User Hotkey Driver Installation, First Edition"; Feb. 2001; p. 1.

METHOD AND APPARATUS FOR INTEGRATING PERSONAL COMPUTER AND ELECTRONIC DEVICE FUNCTIONS

CROSS-REFERENCE TO RELATED APPLICATION

This application is a continuation of application Ser. No. 12/010,817, filed Jan. 30, 2008, which is a continuation of application Ser. No. 10/859,848, filed Jun. 3, 2004, which is a continuation-in-part (CIP) of U.S. application Ser. No. 10/352,676, entitled "METHOD AND APPARATUS FOR INTEGRATING PERSONAL COMPUTER AND ELECTRONIC DEVICE FUNCTIONS, filed on Jan. 28, 2003, now U.S. Pat. No. 6,765,788, which is hereby incorporated by reference.

BACKGROUND

The present invention relates to a personal computer integration technology, and in particular to an apparatus and a method for integrating personal computer and electronic device functions.

Presently, personal computers feature powerful computing capability and a wide range of multimedia capabilities. Integrating personal computer and electronic device functions has become an important priority in the personal computer industry. However, there exist problems in integrating personal computer and electronic device functions.

One challenge is to provide an integrated interface, such as a keyboard or a remote controller, to execute the personal computer and electronic device functions. In addition, the information and text conventionally appearing in the display accompanying the power-up procedures of the personal computer are complex and overly technical in the integrated mode. Finally, personal computer hardware dedicated to integration of this type is costly and cannot fully satisfy user requirements.

SUMMARY

Accordingly, an object of the invention is to provide a method and apparatus for integration of hardware, operating system, and application programs. Using an input device with integrating functions, such as a keyboard or a remote controller, the personal computer can maintain its original powerful functions while enabling electronic device function.

Another object of the invention is to provide a customized BIOS to improve power-up procedures to make integrate them with electronic device function.

To achieve the present objects, one embodiment of the invention discloses an apparatus for integrating personal computer and electronic device functions, comprising an input device, a personal computer host; and an encoder.

The input device includes dedicated personal computer and electronic device function hot keys. The personal computer hot key enables a standard personal computer mode. Electronic device function hot keys enable electronic device mode. Electronic device function hot keys are provided by adding extra keys to the input device layout or by assigning existing keys to function on the input device as hot keys.

The input device can be designed, specifically for personal computer integration with electronic device functions such as DVD, VCD, CD, MP3, TV, VCR and Radio. Alternatively, the input device can be enabled by assigning existing keys to function on the input device as electronic device function hot keys, eliminating the need for extra keys on an input device, Practically, the input device can be implemented as a keyboard or a remote controller. When the input device is a keyboard, the encoder can be a keyboard. When the input device is a remote controller, the encoder can be a corresponding encoder.

The personal computer host includes a customized BIOS and electronic device application programs. The customized BIOS executes power-up procedures in electronic device mode. if the hot key used is the personal computer function hot key, the personal computer host enters personal computer mode and standard follow-up steps of the power-up procedure follow. Thus, standard personal computer functions are provided, irrespective of mode employed. For electronic device function, the personal computer host enters electronic device mode and the follow-up steps of power-up procedures are performed by the customized BIOS, in which power-up procedures are accompanied by graphics and text matching electronic device function.

Electronic device application programs execute electronic device function according to keys used and registered by the encoder. As an example, if the DVD/VCD hot key is used, electronic device application programs execute DVD/VCD function. If the FM/Radio hot key is used, electronic device application programs execute FM/Radio function. Electronic device application programs are provided by any computer-executable program language, such as C, C++. As given above, electronic device functions are enabled without affecting the original personal computer functions, accomplishing a major aim of the invention.

The encoder is coupled with the personal computer host and the input device. The encoder produces code corresponding to the hot key used in the input device, and sends the corresponding code to the personal computer host.

In addition, another embodiment of the invention discloses a method for integrating personal computer and electronic device functions. First, an input device, personal computer host, and encoder are provided. The input device includes dedicated personal computer and electronic device function hot keys. The personal computer host, comprising customized BIOS and electronic device application programs, executes the personal computer functions and electronic device function. The encoder, coupled with the personal computer host, and the input device, produces corresponding code from hot keys used.

Using a hot key, with the personal computer in off or standby mode enables the personal computer host. The encoder produces the corresponding code according to the hot key used and sends the corresponding code to the personal computer host.

The personal computer host then determines whether the hot key used is the personal computer function hot key or electronic device function hot key according to the corresponding code, and, accordingly, enters personal computer mode, executing standard personal computer functions, or electronic device mode, initiating electronic device application programs to execute electronic device function.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
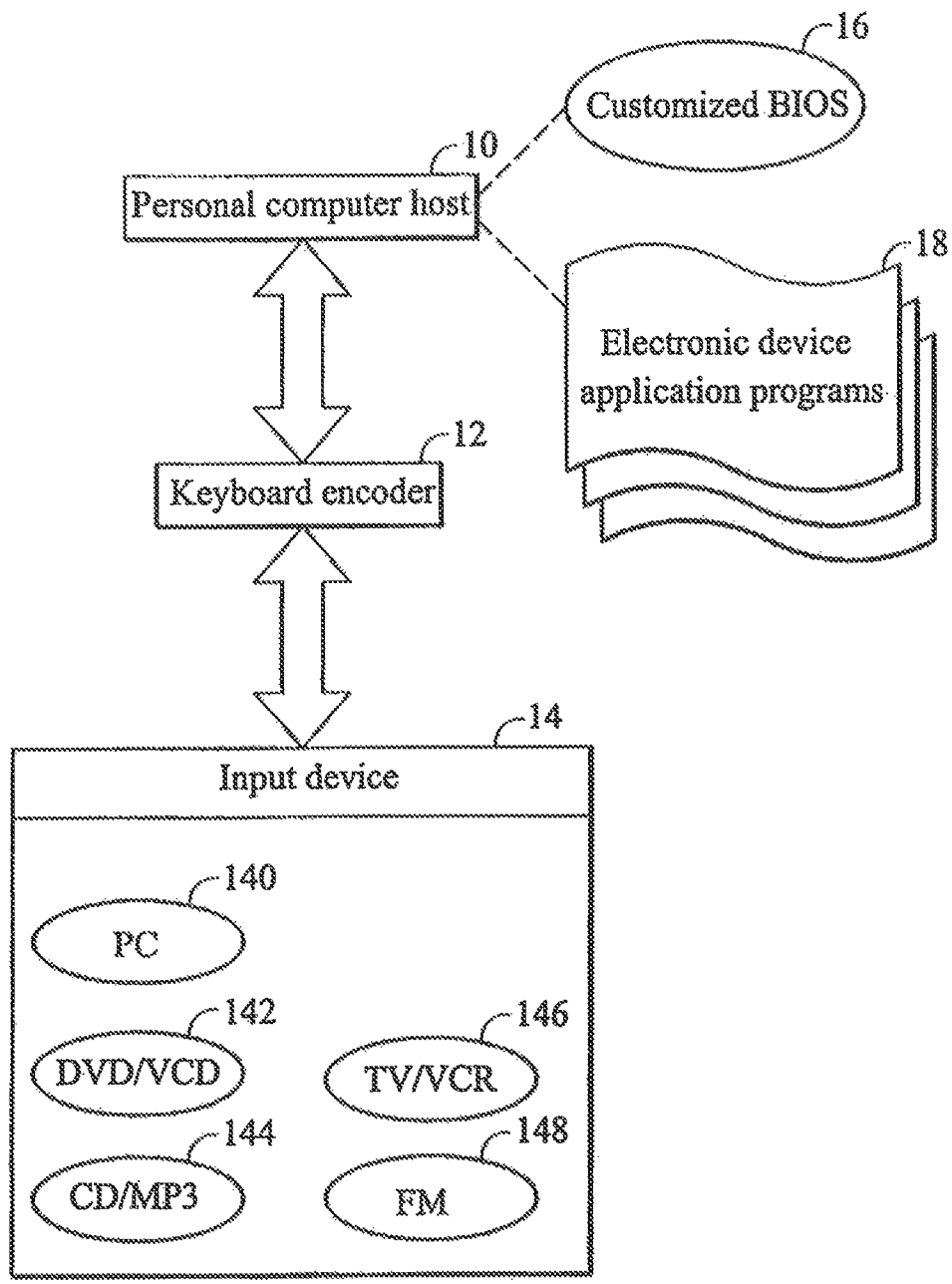
FIG. 1 is a diagram of the apparatus for integrating personal computer and electronic device functions according to a first embodiment of the present invention.

FIG. 1 is a diagram of the apparatus for integrating personal computer and electronic device functions according to a first embodiment of the present invention. In the first embodiment, the invention discloses an apparatus comprising an input device 14, a personal computer host 10, and an encoder 12. In the first embodiment, the input device 14 is an integrated keyboard and the encoder 12 is a keyboard encoder. The input device 14, i.e. an integrated keyboard, includes a personal computer function hot key 140 and electronic device function hot keys. The diagrammed electronic device function hot keys include DVD/VCD hot key 142, CD/MP3 hot key 144, TV/VCR hot key 146, and FM/Radio hot key 148, although the inventive apparatus and method can encompass any applied electronic device functions. The personal computer function hot key 140 enables the personal computer mode, providing the personal computer functions. Electronic device function hot keys are provided by adding dedicated keys to a standard keyboard layout, or by assigning existing keys to function as the hot keys in a standard keyboard. Here, the input device 14 can be implemented in other devices, such as a remote controller.

The personal computer host 10 includes a customized BIOS 16 and electronic device application programs 18. The customized BIOS 16 executes power-up procedures in electronic device mode. Electronic device application programs 18 execute electronic device functions in electronic device mode, according to the hot keys used and registered by the keyboard decoder 12. The DVD/VCD hot key 142, for example, instructs the personal computer host to initiate the corresponding electronic device programs 18 and execute DVD/VCD function. Like key use for other functions enables like activation of corresponding devices. Electronic device application programs 18 are provided by any computer-executable program language, such as C, C++.

The keyboard encoder 12 is coupled with the personal computer host 10 and the input device 14. The keyboard encoder 12 produces a corresponding code when activated by a hot key in the input device 14, and sends the corresponding code to the personal computer host 10.

Figure 2:
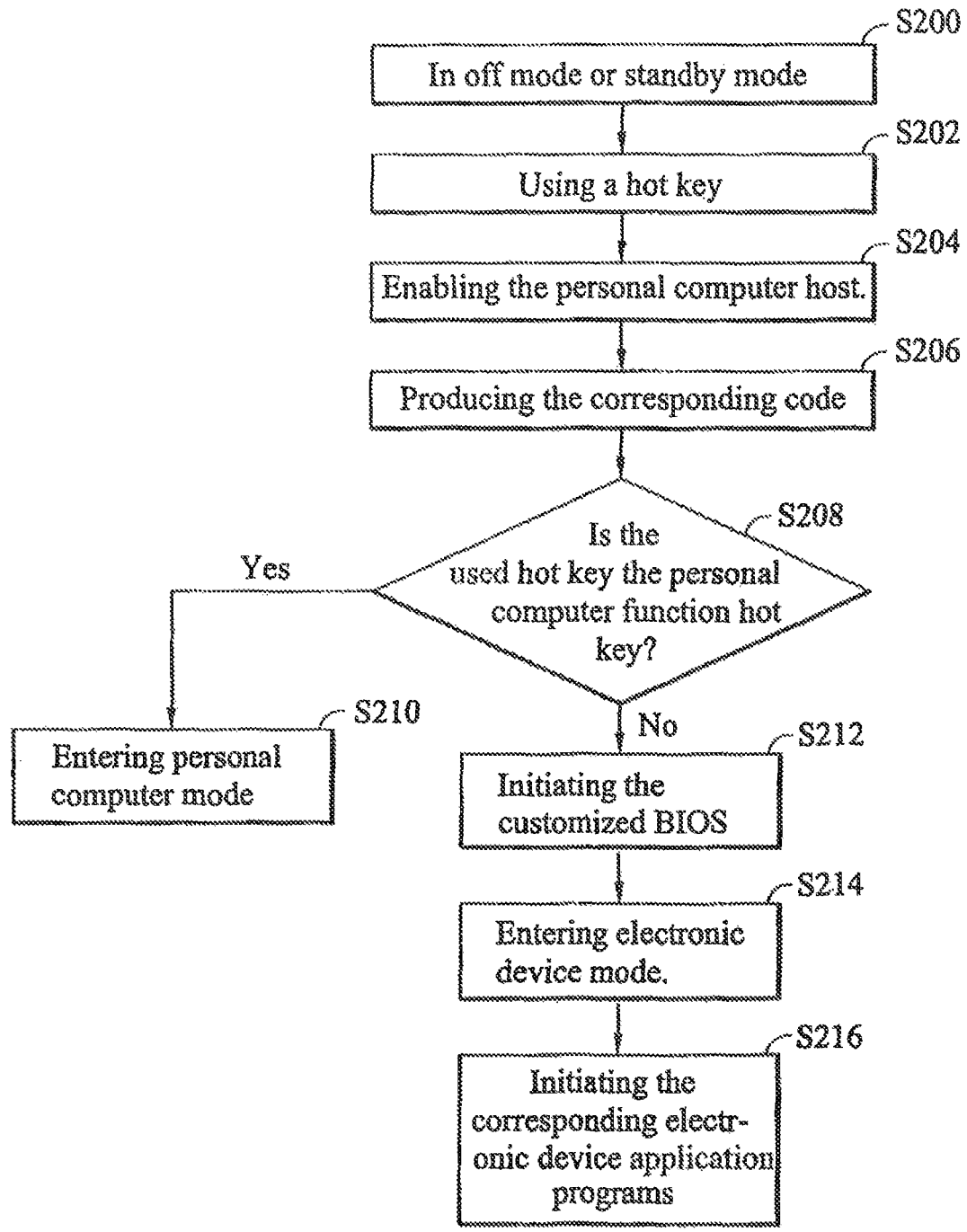
FIG. 2 is a flowchart of the method for integrating personal computer and electronic device functions according to a second embodiment of the present invention.

FIG. 2 is a flowchart of the method for integrating personal computer and electronic device functions according to a second embodiment of the present invention, in the second embodiment, an input device, personal computer host, and encoder are first provided.

The input device includes dedicated personal computer and electronic device function hot keys. Electronic device function hot keys are provided by adding dedicated keys to the input device layout or by assigning existing keys to function as hot keys on the input device. The input device can be a keyboard or a remote controller. In the second embodiment, the input device is a keyboard and the encoder is a keyboard encoder.

The personal computer host includes a customized BIOS and electronic device application programs. The personal computer host executes both personal computer and electronic device functions. Electronic device function programs are provided by any computer-executable program language. Electronic device application programs execute electronic device function according to the hot key used and registered by the keyboard encoder. The keyboard encoder is coupled with the personal computer host and the input device. The keyboard encoder produces the corresponding code according to the key used.

A hot key on the input device is used with the computer system in off or standby mode (S200, S202) and the hot key used enables the personal computer host (S204). The personal computer and electronic device function hot keys provide corresponding functionalities, respectively, such that, when enabled, the personal computer host enters power-up mode from off or standby mode.

The keyboard encoder identifies the hot key used, produces the corresponding code (S206), and sends the corresponding code to the personal computer host. The personal computer host then determines whether the hot key used is the personal computer function hot key or the electronic device function hot key according to the corresponding code (S208), If the personal computer function hot key is used, the personal computer host enters personal computer mode and executes personal computer functions (S210). If the electronic device function hot key is used, the personal computer host initiates the customized BIOS (S212) and enters electronic device mode (214). The personal computer host then initiates the corresponding electronic device application programs to execute electronic device function (S216).

Thus, the described embodiments of the apparatus and method for integrating personal computer and electronic device functions, integrating personal computer hardware with modified operation system and application programs to accomplish personal computer functions and electronic device function at the same time, The personal computer can maintain normal functions and, at the same time, enables electronic device function with the integrated interface, While embodiments of the invention have been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of integrating personal computer and electronic device functions, comprising:

receiving, by a personal computer host in an off mode, a code corresponding to a selection from an input device that includes a personal computer function hot key and an electronic device function hot key, wherein the personal computer function hot key, when selected, enables a personal computer mode of the personal computer host for providing personal computer functions, the electronic device function hot key, when selected, enables an electronic device mode of the personal computer host that provides an electronic device function corresponding to the selected electronic function hot key, wherein the electronic device function is a multimedia function, and the personal computer host comprises a single operating system, a customized BIOS, and electronic device application programs, and the personal computer host is configured to operate in the off mode and an operation mode, the off mode reflecting a state of operation where the operating system is not loaded, the electronic device application programs are not executing, and the personal computer host is not enabled, and the operation mode reflects a state of operation where the personal computer host is enabled, the operation mode including:
  the personal computer mode that, when enabled, reflects a state of operation where the operating system is loaded and executed and provides standard personal computer functions to be performed, and
  the electronic device mode that, when enabled, reflects a state of operation where the customized BIOS is initiated and provides electronic device functions to be performed;
enabling, in response to receiving the corresponding code, the personal computer host, and entering from the off mode, by the personal computer host, either the personal computer mode when the corresponding code is associated with the personal computer function hot key or the electronic device mode when the corresponding code is associated with the at least one electronic device function hot key;
when the received corresponding code is associated with the personal computer function hot key:
  entering by the personal computer host the personal computer mode,
  executing personal computer power up procedures prior to loading and executing the operating system, and
  performing standard personal computer functions after loading and executing the operating system; and
when the received corresponding code is associated with the electronic device function hot key:
  entering by the personal computer host the electronic device mode,
  executing the customized BIOS to perform electronic device power up procedures, at least one aspect of the electronic device power up procedures associated with the electronic device power up mode being distinct from the personal computer power up procedures associated with the personal computer mode, and
  executing, in the electronic device power up mode, a first electronic device application program to perform a first electronic device function that is associated with the electronic device function hot key.

2. The method of claim 1, further comprising:
providing, during the electronic device power up procedures, content for display matching an electronic device function associated with the electronic device function hot key, the content for display being content that is not provided with the personal computer power up procedures.

3. The method of claim 2, wherein the content for display includes graphics and text matching the electronic device function associated with the electronic device function hot key.

4. The method of claim 1, further comprising:
enabling the electronic device function hot key by assigning functionality to at least one existing key on the input device.

5. The method of claim 1, wherein the input device includes a first electronic device function hot key and a second electronic device function hot key.

6. The method of claim 1, wherein the input device is a keyboards.

7. The method of claim 1, wherein the input device is a remote controller.

8. The method of claim 1, wherein receiving, by the personal computer host in the off mode, the code corresponding to the selection from the input device includes:
receiving from an encoder, by the personal computer host in the off mode, the code corresponding to the selection from the input device.

9. The method of claim 1, further comprising:
providing personal computer functions while the personal computer host is in the electronic device mode.

* * * * *